May 8, 1923.

A. B. WALTERS

LIQUID MEASURING AND DISPENSING DEVICE

Filed June 16, 1921

1,454,572

Inventor:
Arthur B. Walters
By Alexander & Dowell
His Attorneys

Patented May 8, 1923.

1,454,572

UNITED STATES PATENT OFFICE.

ARTHUR B. WALTERS, OF KANSAS CITY, MISSOURI.

LIQUID MEASURING AND DISPENSING DEVICE.

Application filed June 16, 1921. Serial No. 478,045.

*To all whom it may concern:*

Be it known that I, ARTHUR B. WALTERS, a citizen of the United States, residing at Kansas City, in the county of Jackson and State of Missouri, have invented certain new and useful Improvements in Liquid Measuring and Dispensing Devices; and I hereby declare that the following is a full, clear, and exact description thereof, reference being had to the accompanying drawings, which form part of this specification.

This invention is a novel measuring and dispensing device particularly designed for use in discharging measured quantities of liquid from a container into a receptacle; and may be operated by pressing the receptacle against the device to cause the discharge of the desired quantity of liquid.

One object of the invention is to provide a simple device for measuring pre-determined quantities of liquid; such as syrup dispensed at soda fountains. Another object is to provide a syrup dispenser which does not drip after operating it. Still another object is to provide a syrup dispenser which is simple and easily cleansed; can be easily operated by thrusting a glass or other receptacle upwardly against the device thus requiring only one hand of the clerk to operate it.

I will explain the invention with reference to the accompanying drawings which illustrate some practical embodiments of the invention, by way of illustration thereof, and set forth in the claims the essentials of the invention and the novel features of construction and novel combinations of parts for all of which protection is desired.

In said drawings.

Figure 1:
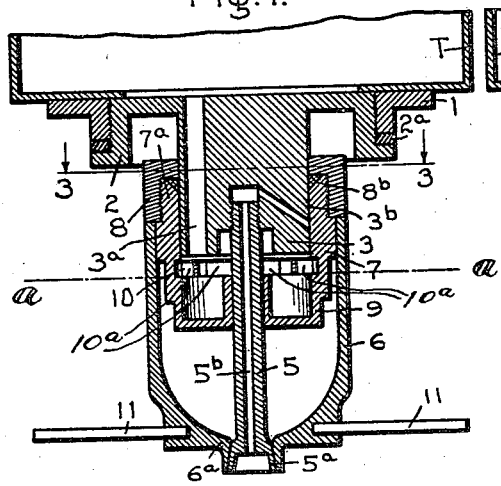
Fig. 1 is a sectional view of my measuring device in closed position.
Figure 2:
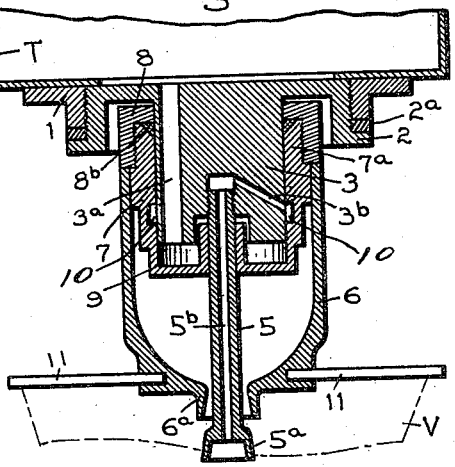
Fig. 2 is a similar view thereof in discharging position.

Referring to Figs. 1 and 2; 1 is an internally threaded annulus which may be formed on or otherwise secured to the bottom of a container or a tank T of any suitable construction. 2 is a casting the upper end of which is screwed into the annulus 1, and may be provided with a suitable packinng, as at 2ª, to form a fluid tight joint therewith. The casting 2 has a depending cylindric portion 3 which is provided with a number of longitudinal passages 3ª parallel with its axis through which the liquid passes from the tank into the measuring vessel 6.

Connected to and axially from the part 3 is a valve stem 5 on the lower end of which is a valve 5ª. This stem may be formed on or detachedably secured to the part 3 as indicated in the drawings. Said valve stem has a central air passage 5ᵇ which communicates at its upper end with an air passage 3ᵇ in the part 3, so as to permit air to enter the vessel as hereinafter explained.

Slidably mounted on the part 3 is a casting 7 which fits closely to the part 3 and has a threaded upper portion 7ª which is engaged by an annulus 8, and a packing 8ᵇ is interposed between the annulus 8 and the upper end of the part 7 so as to form a close sliding liquid tight joint between the upper end of part 7 and the exterior of part 3.

Attached to and depending from the member 7 is a member 6 the interior of which forms a measuring vessel or chamber. The lower part of this member 6 is closed but provided with a valve opening or seat 6ª which is closed by the valve 5ª when the measuring vessel is in its lowermost position as shown in Fig. 1.

Vessel 6 may be provided with laterally projecting arms or flanges as at 11 against which the upper end of a glass or other receptacle V indicated in dotted line in Fig. 2 may be pressed so as to raise the vessel 6 to the position shown in Fig. 2 when it is desired to discharge the contents of the measuring vessel 6 into said receptacle.

A cup 9 is connected with and suspended from the member 7 within the vessel 6 and said cup has a central opening surrounded by a flange for the passage of the stem 5 and is fixedly connected with and suspended from the casting 7 in any suitable way so as to leave a passage 10 between the upper end of the cup and the lower end of the part 3 with ports 10ª therein adapted for the passage of liquid into vessel 6.

When the parts are in position shown in Fig. 1 the liquid from the tank T passes through the passages 3ª into the cup 9 and overflows the latter escaping through the passage 10 into the vessel 6 wherein it is retained by the valve 5ª, the liquid filling the chamber or vessel 6 up to the point indicated by the dotted line a—a in Fig. 1 where it becomes air sealed.

By pressing a glass or receptacle V upwardly against the flange or fingers 11 the measuring vessel 6 may be raised to the position shown in Fig 2. In this position the liquid in the cup 9 seals the lower end of the passages 3, so that entry of air into the tank is cut off, and flow of liquid from the tank is thereby prevented. At the same time the valve 5ª is opened and liquid flows from the vessel 6 into the receptacle V, the air entering the vessel 6 through the passages 5ᵇ, 3ᵇ and ports 10, 10ª. When the receptacle V is removed the vessel 6 drops to the position shown in Fig. 1 the valve 5ª closing the opening 6ª and part 7 closing the air passage 3ᵇ, and liquid flows from the tank through passage 3ª into the vessel 6 until the latter is filled to the line a—a Fig. 1.

Figure 4:
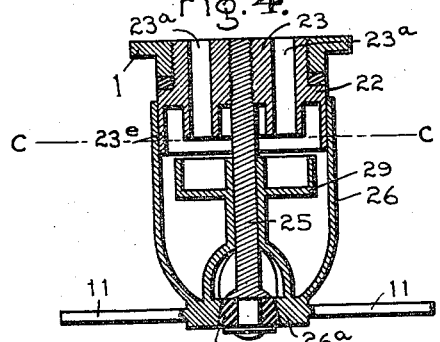
Fig. 4 is a view similar to Fig. 1 showing a modification of the device.
Figure 3:
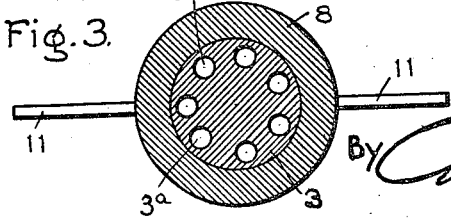
Fig. 3 is a detail sectional view on the line 3—3 Fig. 1.

In the construction shown in Fig. 4 the casting 22 has a central portion 23 provided with passages 23ª, as in Fig. 1 through which the fluid escapes into the vessel 26 which has an opening 26ª in its lower end closed by a valve 25ª on a stem 25 which is attached to the casting 2. Supported within and on the vessel 26, so as to be movable therewith, is a cup 29. The vessel is provided with fingers or flanges 11 as in Fig. 1. The operation is similar to the construction shown in Fig. 1.

Normally the receptacle 26 when in the position shown in Fig. 4 will be filled with liquid, but when the vessel is raised, by placing a receptacle V under the arms 11, the liquid in cup 29 seals the lower ends of the passages 23ª and at the same time the valve 25ª is unseated so that liquid can flow out of the vessel 26 into the receptacle; the operation of the parts being the same as above described in relation to Figs. 1 and 2.

The casting 22 in Fig. 4 is provided with a flange 23ᵉ exterior to and surrounding openings 23 and the casting 33 has a similar flange 33ᵉ. These flanges come into use when the tank is to be filled. When the tank is to be filled the measuring vessel is emptied and while it is held in its raised position the tank and measuring device are inverted; and while so inverted the flange 23ᵉ (or 33ᵉ) retains the liquid remaining in the device while the tank is inverted.

In each of these measuring devices I employ a valve at the bottom of the measuring vessel only, the upper port or inlet being closed when the valve is open by the fluid in the cups sealing the tank from taking air.

My novel measuring and dispensing devices are frictionless, simple, and reliable; in each case the valve is a simple taper one and there is practically no point which holds liquid or causes it to drip; and in each when the valve is closed it cuts off all flow of the liquid. This is especially useful in dispensing syrup at soda fountains. Each of these measuring devices may be inverted when it is desired to fill the tank and each is leak proof and each is easily dismantled for cleansing.

I have illustrated various forms of the device merely to show that the invention is capable of modification and variation and I do not consider the invention restricted to any one of the specific forms illustrated in the drawing, as other changes and modifications may be made in the form and construction of parts while retaining the essentials of the invention.

What I claim is:

1. In a liquid measuring and dispensing apparatus the combination of a member attached to a liquid container and having a fluid passage, a vessel slidably connected with said member to receive liquid from said passage, and having an outlet opening, a valve connected with said member adapted to close said outlet opening when the vessel is in lowered position and a cup within said member and movable therewith adapted to seal the said passage when the vessel is raised and the valve opened, and means whereby air is admitted into said vessel when the valve is opened, and air is shut off when the valve is closed, substantially as described.

2. In a liquid measuring and dispensing apparatus the combination of a member attached to a liquid container and having a depending part provided with passages; a member slidably connected with said part, a vessel connected with said member receiving liquid from said passages and having an outlet opening, a valve stem connected with said depending part, a valve on said stem adapted to close said opening when the vessel is in lowered position, and a cup within said vessel slidable on said stem and movable with the vessel, said cup being adapted to fluid seal the inlet passage when the vessel is raised and the valve opened, substantially as described.

3. In a liquid measuring and dispensing apparatus as set forth in claim 2 means whereby air is admitted into said vessel when the valve is opened and air is shut off when the valve is closed.

4. In a liquid measuring and dispensing device a member adapted to be attached to a liquid container and provided with a fluid passage and a lateral air passage, a measuring vessel into which said fluid passage discharges, said vessel having a discharge opening, a valve for closing said discharge opening, a member for closing the air passage when the valve is closed, and a cup within said vessel adapted to seal the fluid passage when the valve is open, and to open the fluid passage when the valve is closed.

5. In a liquid measuring and dispensing device, a member adapted to be attached to a liquid container and having a depending portion provided with a fluid passage and an air passage, a measuring vessel connected with said member into which the passage discharges, said vessel having a discharge opening in its lower end and a portion adapted to close the air passage when the discharge opening is closed, a valve for closing the discharge opening, and a cup within said vessel adapted to seal the fluid passage when the valve is open, and to open the fluid passage when the valve is closed, and means for simultaneously raising the cup and opening the valve.

In testimony that I claim the foregoing as my own, I affix my signature.

ARTHUR B. WALTERS.